(12) United States Patent
Imaoka

(10) Patent No.: US 7,591,651 B2
(45) Date of Patent: Sep. 22, 2009

(54) SUBSTRATE WITH HELICALLY CURVED TERMINALS SUPERIMPOSED AND CONNECTED TO IDENTICAL TERMINALS ON A SECOND SUBSTRATE

(75) Inventor: Norio Imaoka, Takamori-machi (JP)

(73) Assignee: Epson Imaging Devices Corporation, Nagano, Azumino-shi (JP)

( * ) Notice: Subject to any disclaimer, the term of this patent is extended or adjusted under 35 U.S.C. 154(b) by 216 days.

(21) Appl. No.: 11/837,441

(22) Filed: Aug. 10, 2007

(65) Prior Publication Data
US 2008/0074603 A1    Mar. 27, 2008

(30) Foreign Application Priority Data
Sep. 27, 2006    (JP) .............................. 2006-262233

(51) Int. Cl.
*H01R 12/00* (2006.01)
(52) U.S. Cl. ........................................ 439/74
(58) Field of Classification Search .................. 439/74, 439/66, 65, 67, 69, 81, 91, 591; 336/200
See application file for complete search history.

(56) References Cited
U.S. PATENT DOCUMENTS
7,029,288 B2 *   4/2006   Li ................. 439/66

2003/0030533 A1 *   2/2003   Waffenschmidt ............ 336/200
2003/0176083 A1 *   9/2003   Li et al. ........................ 439/66
2007/0008058 A1 *   1/2007   Hashimoto .................. 336/200
2007/0066092 A1 *   3/2007   Soeta ............................ 439/67
2008/0194124 A1 *   8/2008   Di Stefano .................... 439/66

FOREIGN PATENT DOCUMENTS

| JP | 07-049657 A | 2/1995 |
| JP | 2002-032030 A | 1/2002 |
| JP | 2003-046212 A | 2/2003 |
| JP | 2003-218492 A | 7/2003 |
| JP | 2004021003 A | 1/2004 |
| JP | 2004363153 A | 12/2004 |
| WO | 99/23696 A1 | 5/1999 |

* cited by examiner

*Primary Examiner*—Chandrika Prasad
(74) *Attorney, Agent, or Firm*—Lowe Hauptman Ham & Berner, LLP

(57) ABSTRACT

A mounting structure has a substrate with a plurality of terminals having helically curved portions superimposed and electrically connected to a plurality of identical helically curved terminals on a second substrate. This increases the precision of positioning the terminals on one substrate on to those on a second substrate by relatively rotating the first and second substrates which have reference points coincident with each other.

9 Claims, 10 Drawing Sheets

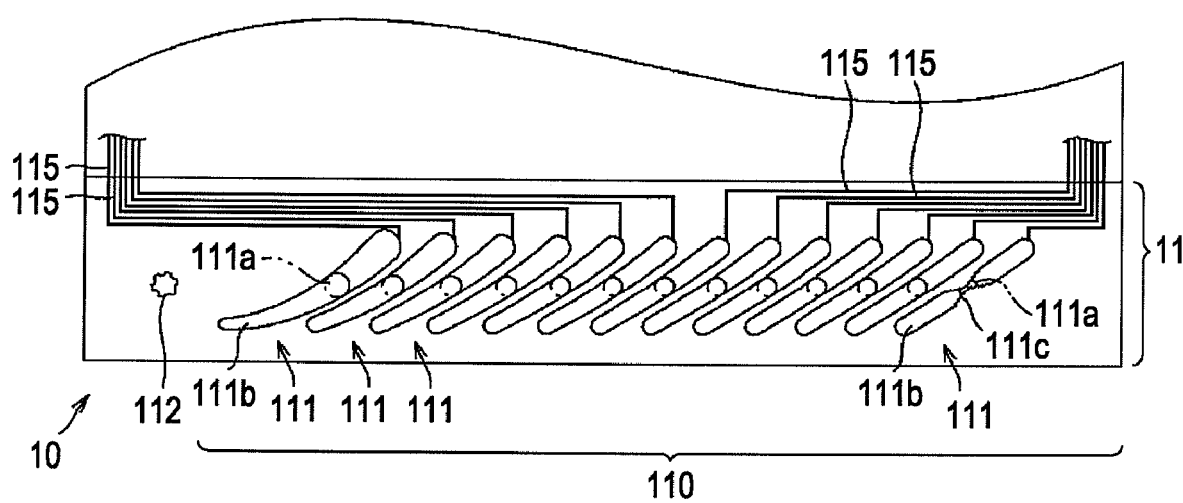
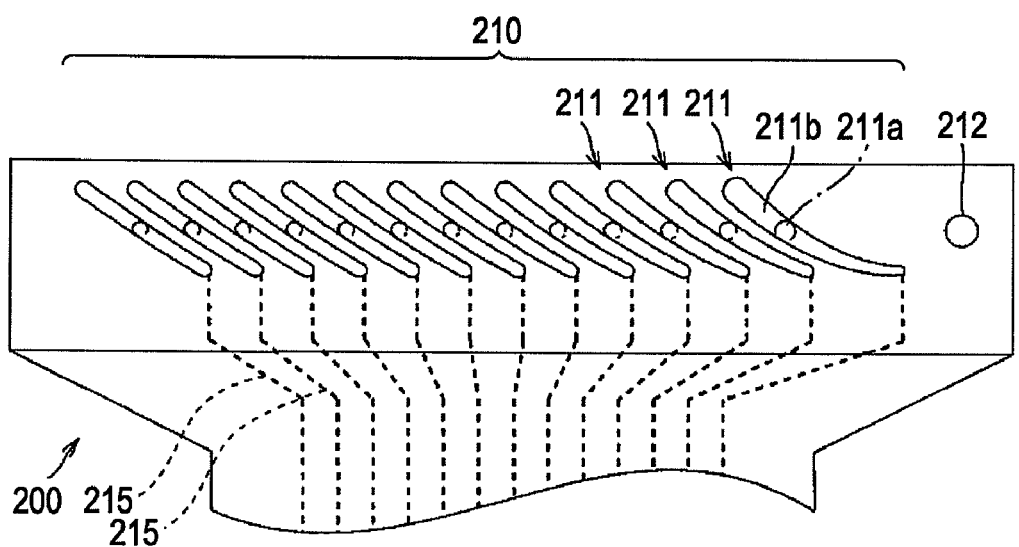

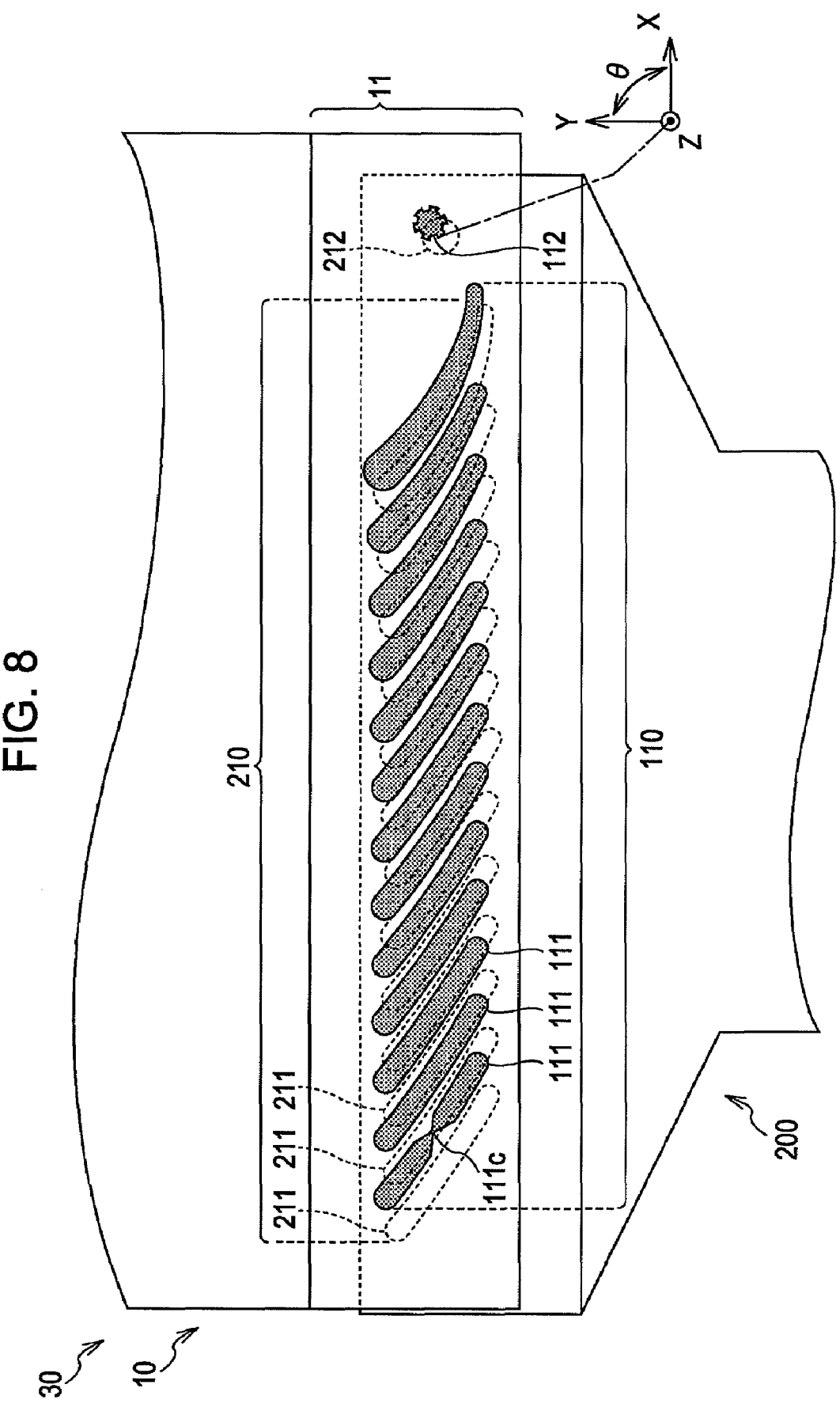

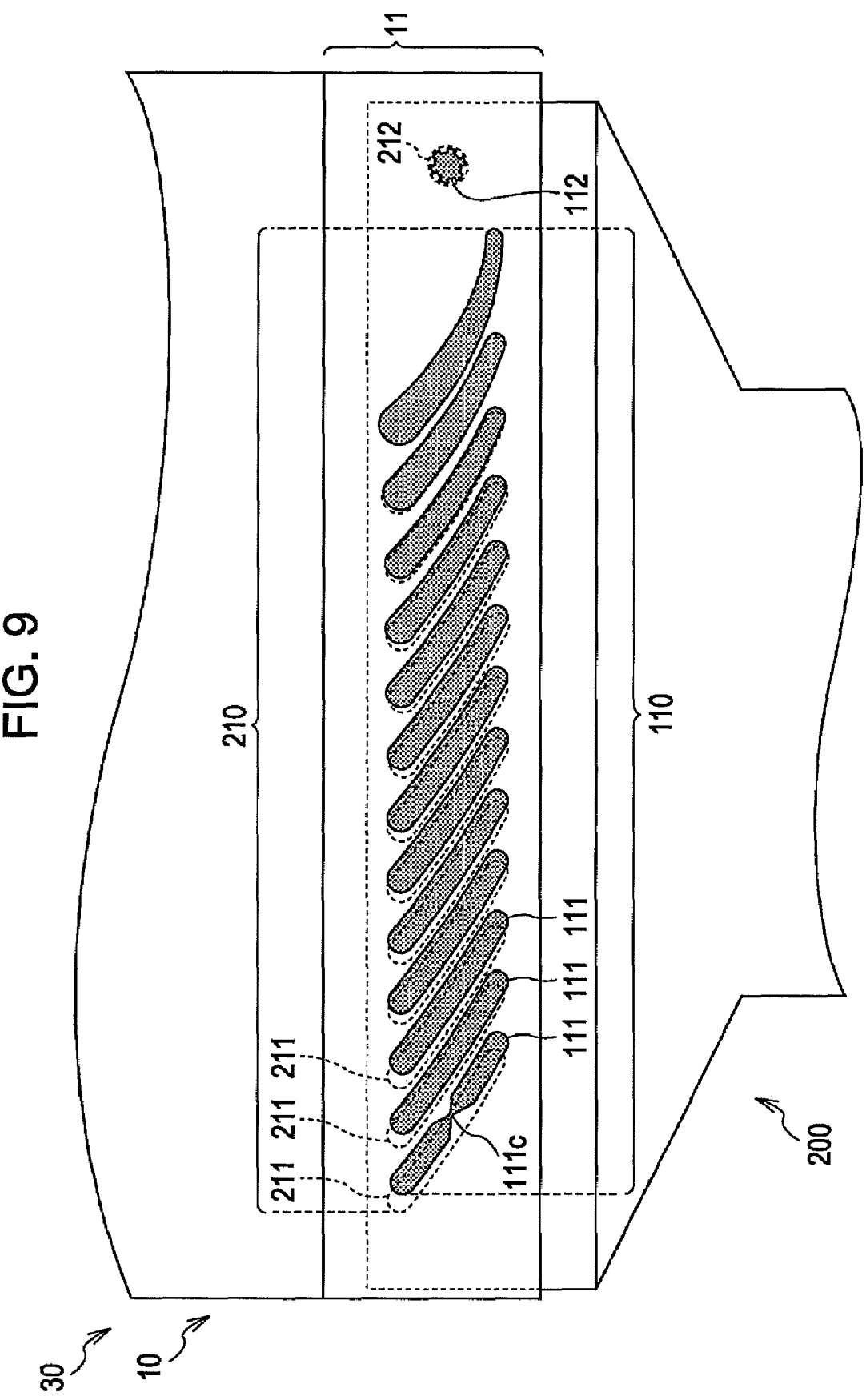

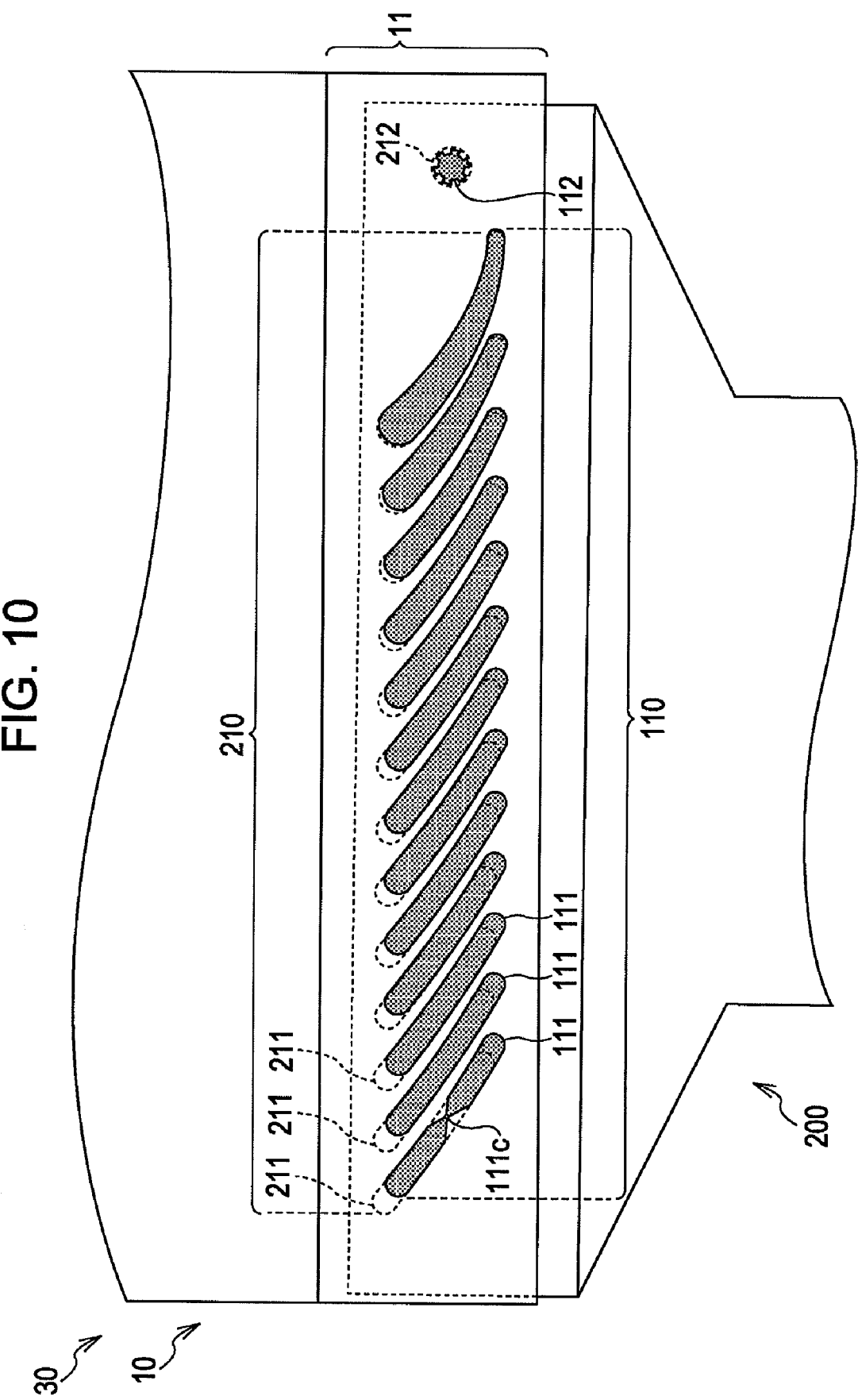

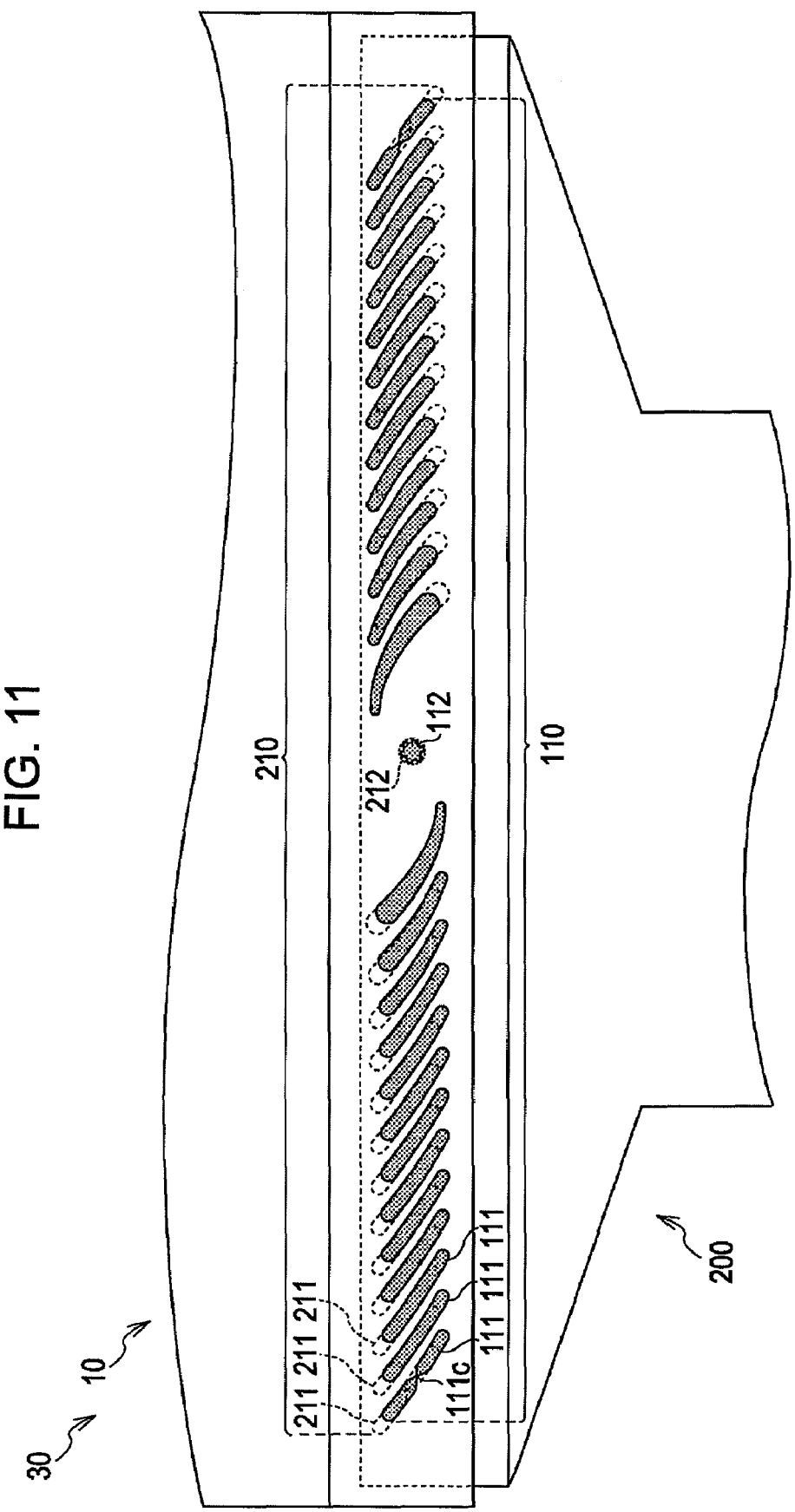

SUBSTRATE WITH HELICALLY CURVED TERMINALS SUPERIMPOSED AND CONNECTED TO IDENTICAL TERMINALS ON A SECOND SUBSTRATE

The entire disclosure of Japanese Patent Application No. 2006-262233, filed Sep. 27, 2006 is expressly incorporated by reference herein.

BACKGROUND

1. Technical Field

The present invention relates to a mounting structure, an electro-optical device and an electronic apparatus in which a plurality of sets of electrode terminals are electrically connected by film on glass (FOG) mounting, chip on glass (COG) mounting, or the like, and a method of manufacturing the mounting structure.

2. Related Art

For example, when plural sets of electrode terminals each forming a pair are electrically connected to each other by the FOG mounting process for connecting a liquid crystal panel to a flexible printed circuit board, electrical conduction between associated electrode terminals cannot be secured if positional deviations occur therebetween. In particular, when one substrate of a pair of substrates connected through electrode terminals is formed on a thin resin film such as a flexible printed circuit board, it is difficult to eliminate positional deviations between the electrodes terminals arranged on the two substrates since the resin film is apt to deform (or expand or contract) due to heat or moisture.

To address this problem, there has been proposed, for example, the technique disclosed in JP-A-2003-46212 in which a plurality of electrode terminals forming a first group on a first electronic component (or substrate) and a plurality of electrode terminals forming a second group on a second electronic component (or substrate) are respectively arranged on a plurality of first and second lines radially extending in the same pattern as each other with respect to the center of first and second points (or reference points), and the electrode terminals of at least one of the first and second groups are formed to extend along the first or second lines. According to this technique, the electrode terminals of the first and second groups are relatively rotated in a state in which the first and second points coincide and one of the electrode terminals of the first group coincides with an electrode terminal of the second group mapped to the associated electrode terminal, such that the electrode terminals of a corresponding set between the groups can coincide even when the substrate becomes deformed.

However, in general, electrode terminals are arranged in an edge portion along one side of each substrate, for example, when a flexible printed circuit board is FOG-mounted to an element substrate of a liquid crystal panel. Accordingly, when the above-described technique is applied to a connection between substrates, it is difficult to set a reference point of radially arranged electrode terminals on the substrate, for example, at a side of the element substrate. When the electrode terminals between the element substrate and the flexible printed circuit board are positioned if the reference point is set outside the substrate, the reference points of the respective substrates may not coincide, resulting in the degradation of workability, the degradation of positioning precision, and the like.

SUMMARY

An advantage of some aspects of the invention is that it provides a mounting structure, an electro-optical device and an electronic apparatus capable of facilitating positioning by absorbing positional deviations between corresponding electrode terminals, and a method of manufacturing the mounting structure.

According to an aspect of the invention, there is provided a mounting structure, including: a first substrate on which a first reference point and a plurality of first electrode terminals are arranged on an identical plane; and a second substrate on which a second reference point forming a pair with the first reference point and a plurality of second electrode terminals electrically connected to the plurality of first electrode terminals respectively forming pairs with the plurality of first electrode terminals are arranged on an identical plane, wherein the plurality of first electrode terminals and the plurality of second electrode terminals forming the pairs each have a basic portion in which a relative position from the first reference point and a relative position from the second reference point are set to be equal to each other, at least one of each of the plurality of first electrode terminals and each of the plurality of second electrode terminals forming the pairs has an additional portion extending from the basic portion, each additional portion is formed to extend in a direction along a helical curve from the basic portion when the additional portion is arranged to pass through the basic portion by rotating one helical curve having a center of the reference point mapped thereto, and the first reference point and the second reference point are superimposed and the plurality of first electrode terminals and the plurality of second electrode terminals respectively forming the pairs are superimposed and electrically connected.

According to this configuration, positional deviations between the first and second electrode terminals forming the pairs can be absorbed even when the first and second substrates expand or contract. Furthermore, the first and second reference points set in relation to the first and second electrode terminals on the first and second substrates can be set to a reference point of the helical curve and positioning between the first and second electrode terminals can be facilitated by only relatively rotating the first and second substrates whose first and second reference points directly coincide.

It is preferable that the helical curve is depicted by rotating a displacement point from a starting point around an origin point while varying a distance from the origin point in proportion to an exponential function in which a value other than 1 is a base and a rotation angle is an exponent.

According to this configuration, a shape of the additional portion can be suitably defined.

It is preferable that the first reference point is arranged to one side of an arrangement of the plurality of first electrode terminals, and the second reference point is arranged to one side of an arrangement of the plurality of second electrode terminals.

According to this configuration, a dead space formed between the first and second reference points can be suppressed at minimum when the first and second electrode terminals are arranged.

An arrangement of the plurality of first electrode terminals is disposed at both sides of the first reference point, and an arrangement of the plurality of second electrode terminals is disposed at both sides of the second reference point.

According to this configuration, a displacement amount of the first and second electrode terminals to the first and second reference points can be minimized even when the first and second substrates expand or contract.

Terminal widths of the plurality of first electrode terminals and the plurality of second electrode terminals forming the pairs are formed to have relatively different terminal widths, and an aperture portion in which a terminal width is partially small is formed on at least one electrode terminal of the plurality of first electrode terminals whose terminal widths are relatively large or the plurality of second electrode terminals.

According to this configuration, positioning between the first and second electrode terminals can be realized with high precision.

According to another aspect of the invention, there is provided an electro-optical device, including: a first substrate on which a first reference point and a plurality of first electrode terminals are arranged on an identical plane; and a second substrate on which a second reference point forming a pair with the first reference point and a plurality of second electrode terminals respectively forming pairs with the plurality of first electrode terminals are arranged on an identical plane, wherein the plurality of first electrode terminals and the plurality of second electrode terminals forming the pairs each have a basic portion in which a relative position from the first reference point and a relative position from the second reference point are set to be equal to each other, at least one of each of the plurality of first electrode terminals and each of the plurality of second electrode terminals forming the pairs has an additional portion extending from the basic portion, each additional portion is formed to extend in a direction along a helical curve from the basic portion when the additional portion is arranged to pass through the basic portion by rotating one helical curve having a center of the reference point mapped thereto, and the first reference point and the second reference point are superimposed and the plurality of first electrode terminals and the plurality of second electrode terminals respectively forming the pairs are superimposed and electrically connected.

According to this configuration, positional deviations between the first and second electrode terminals forming the pairs can be absorbed even when the first and second substrates expand or contract. Furthermore, the first and second reference points set in relation to the first and second electrode terminals on the first and second substrates can be set to a reference point of the helical curve and positioning between the first and second electrode terminals can be facilitated by only relatively rotating the first and second substrates whose first and second reference points directly coincide.

According to another aspect of the invention, there is provided an electronic apparatus, including: the mounting structure as described above.

According to this configuration, the electronic apparatus can be provided which has the mounting structure in which electrode terminals between substrates are positioned with high precision.

According to still another aspect of the invention, there is provided an electronic apparatus, including: the electro-optical device as described above.

According to this configuration, the electronic apparatus can be provided which has the electro-optical device in which electrode terminals between substrates are positioned with high precision.

According to still another aspect of the invention, there is provided a method of manufacturing a mounting structure, the mounting structure including a first substrate on which a first reference point and a plurality of first electrode terminals are arranged on an identical plane, and a second substrate on which a second reference point forming a pair with the first reference point and a plurality of second electrode terminals respectively forming pairs with the plurality of first electrode terminals are arranged on an identical plane, wherein the plurality of first electrode terminals and the plurality of second electrode terminals forming the pairs each have a basic portion in which a relative position from the first reference point and a relative position from the second reference point are equal to each other, at least one of each of the plurality of first electrode terminals and each of the plurality of second electrode terminals forming the pairs has an additional portion extending from the basic portion, and each additional portion is formed to extend in a direction along a helical curve from the basic portion when the additional portion is arranged to pass through the basic portion by rotating one helical curve having a center of the reference point mapped thereto, the method comprising: a first positioning procedure of superimposing the first reference point and the second reference point by arranging the first substrate and the second substrate to face each other; and a second positioning procedure of relatively rotating the first substrate and the second substrate by setting the superimposed first and second reference points to a supporting point and superimposing the plurality of first electrode terminals and the plurality of second electrode terminals forming the pairs.

According to this configuration, positional deviations between the first and second electrode terminals forming the pairs can be absorbed even when the first and second substrates expand or contract. Furthermore, the first and second reference points set in relation to the first and second electrode terminals on the first and second substrates can be set to a reference point of the helical curve and positioning between the first and second electrode terminals can be facilitated by only relatively rotating the first and second substrates whose first and second reference points directly coincide.

BRIEF DESCRIPTION OF THE DRAWINGS

The invention will be described with reference to the accompanying drawings, wherein like numbers reference like elements.

FIG. 3 is a plan view of electrode terminals formed to an element substrate viewed from the side opposite to a flexible printed circuit (FPC) substrate.

FIG. 4 is a plan view of electrode terminals formed to the FPC substrate viewed from the side opposite to the element substrate.

FIG. 8 is a state diagram of the electrode terminals on the two substrates viewed in projection from the side of the element substrate before positioning is made.

FIG. 9 is a state diagram of the electrode terminals on the two substrates viewed in projection from the side of the element substrate when reference points are positioned.

FIG. 10 is a state diagram of the electrode terminals, positioned by relatively rotating the two substrates with respect to the center of the reference points, viewed in projection from the element substrate.

FIG. 11 is an illustrative view showing a modified example of an arrangement of the electrode terminals.

DESCRIPTION OF EXEMPLARY EMBODIMENTS

Figure 1:
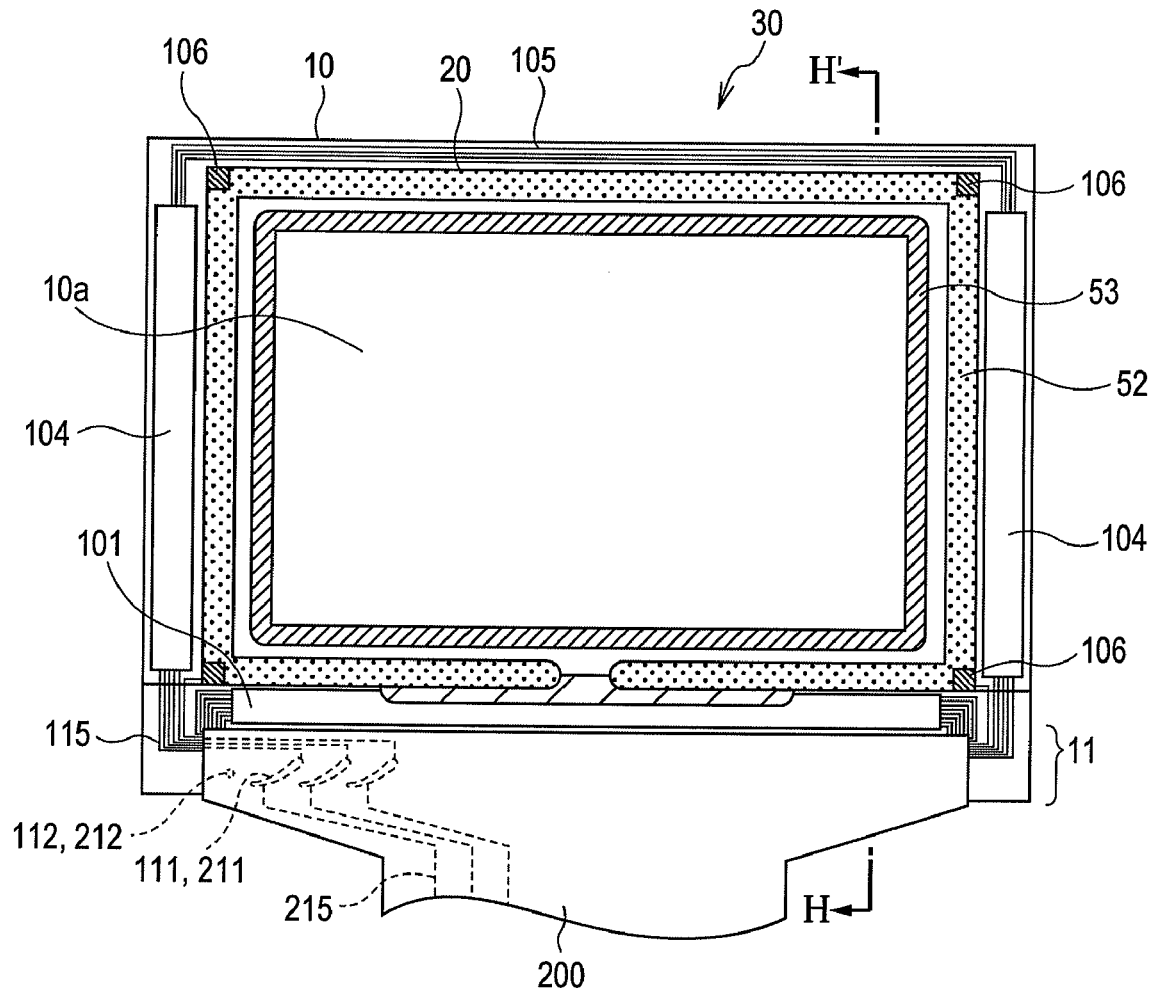
FIG. 1 is a plan view of principal portions of a liquid crystal device viewed from the side of a counter substrate.
Figure 5:
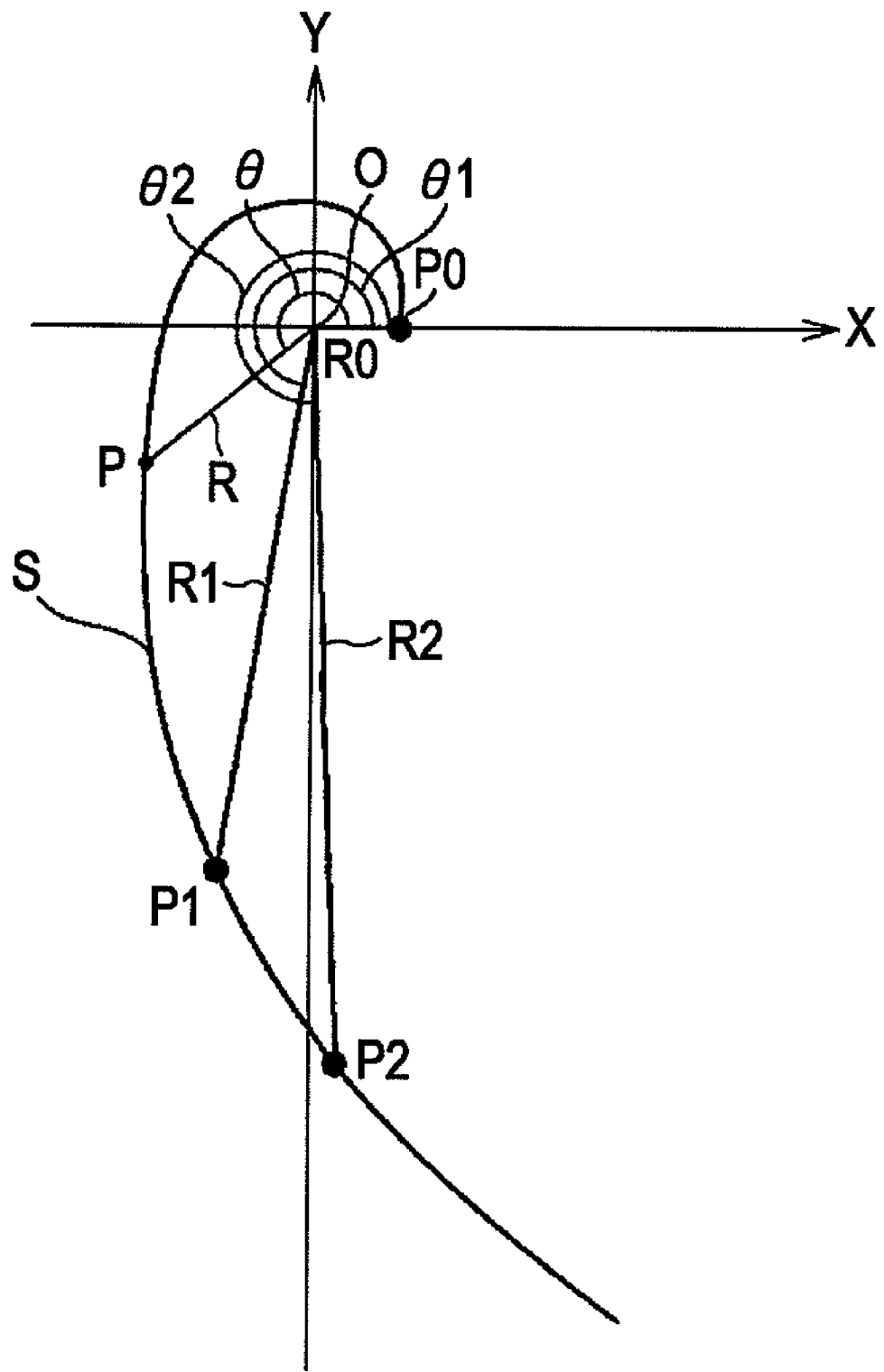
FIG. 5 is an illustrative view of a helical curve.
Figure 6A:
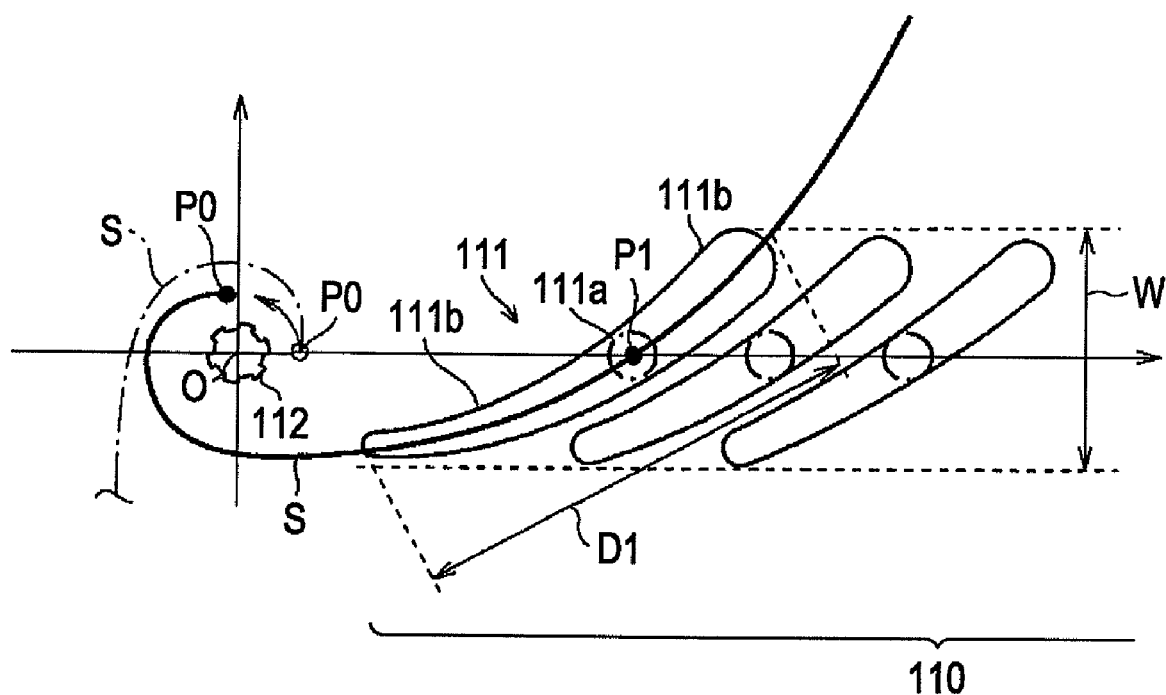
FIGS. 6A and 6B are illustrative views showing a method of designing electrode terminals on the element substrate.
Figure 6B:
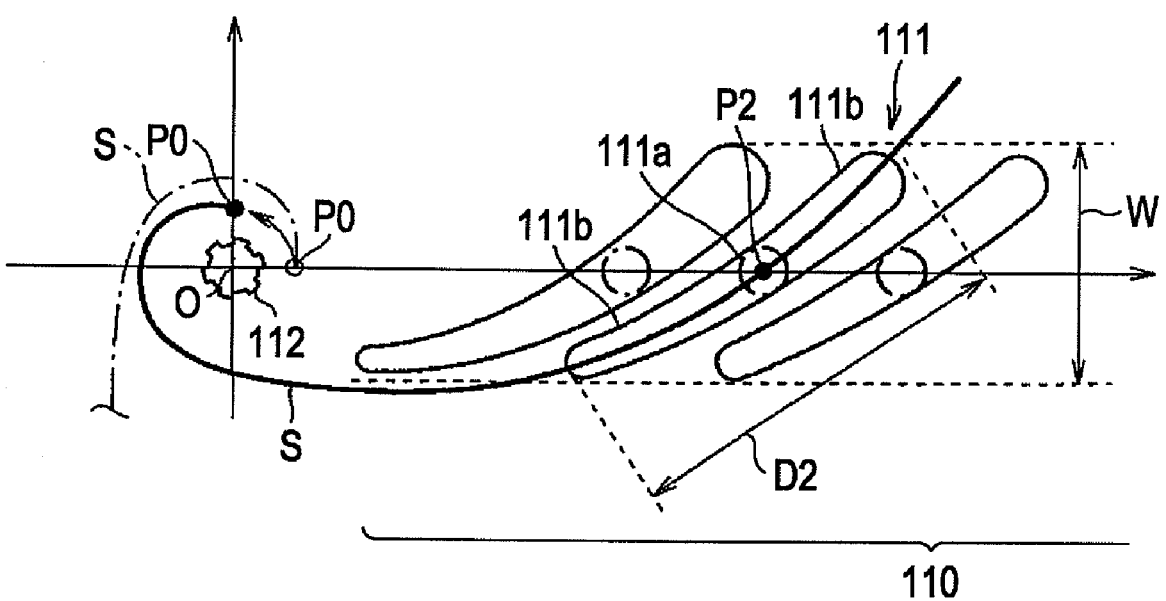
Figure 7A:
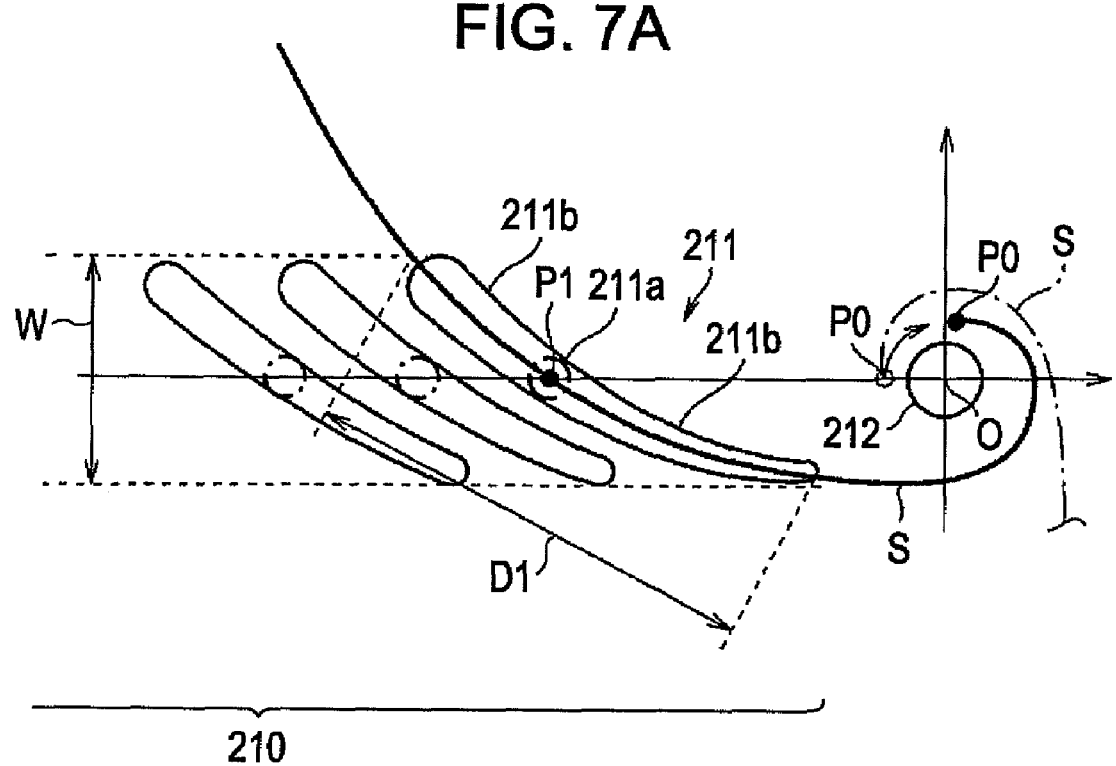
FIGS. 7A and 7B are illustrative views showing a method of designing electrode terminals on the FPC substrate.
Figure 7B:
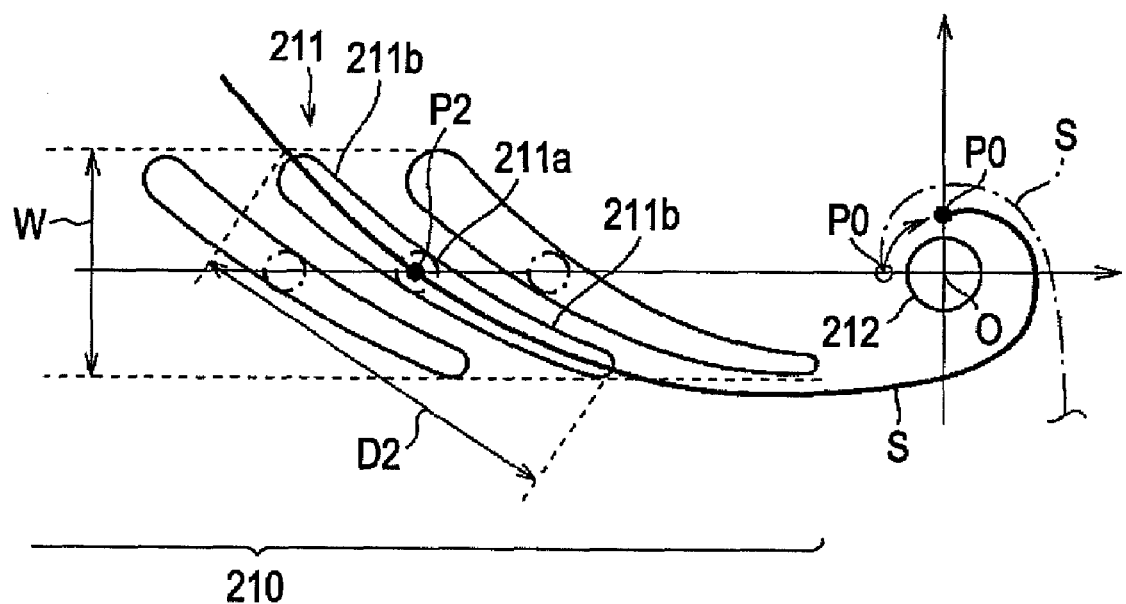
Figure 12:
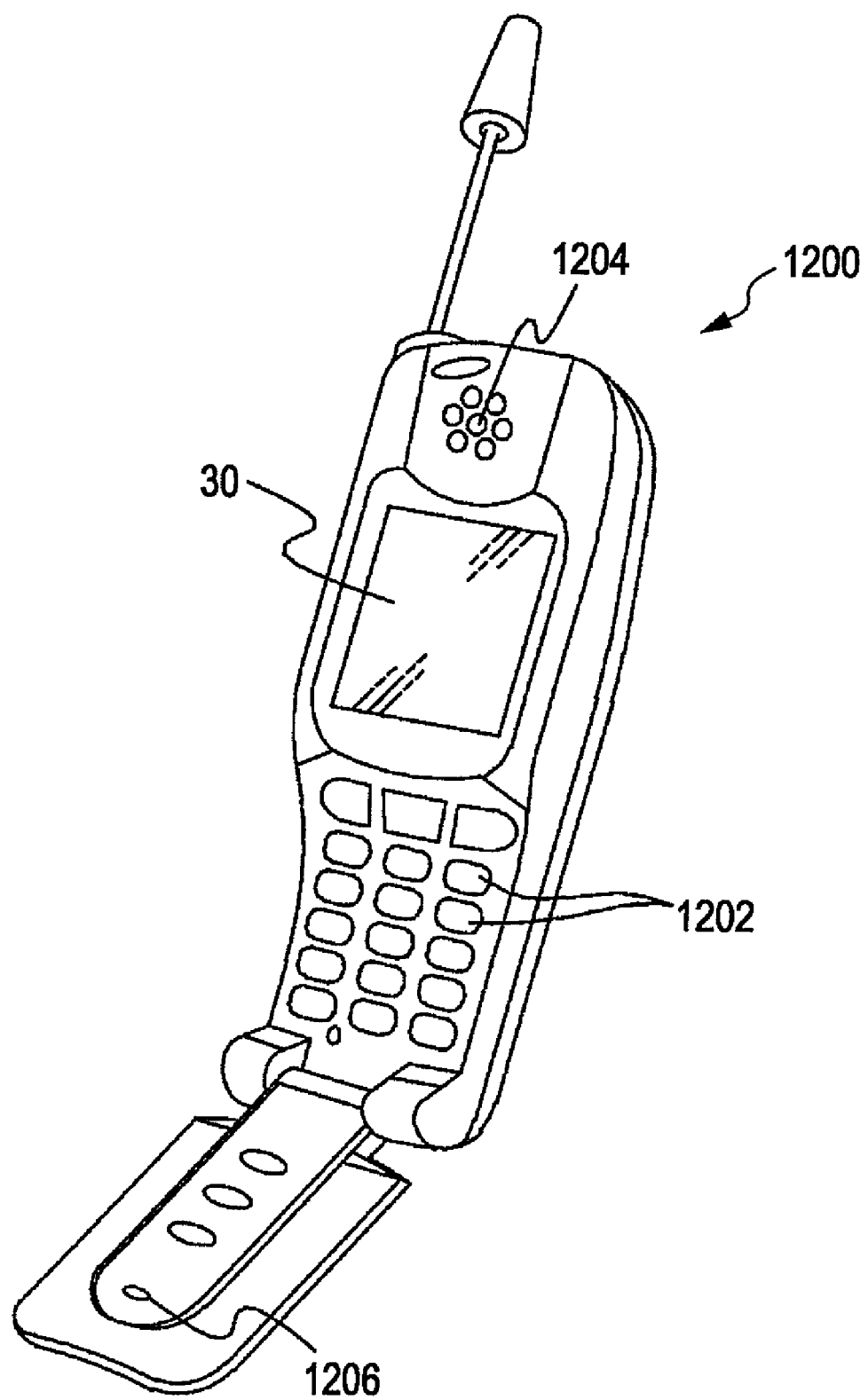
FIG. 12 is a view showing an electronic apparatus.

Hereinafter, embodiments of the invention will be described with reference to the accompanying drawings. The drawings are related to one embodiment of the invention. FIG. 1 is a plan view of principal portions of a liquid crystal device viewed from the side of a counter substrate, FIG. 2 is a sectional view taken along line H-H' of FIG. 1, FIG. 3 is a plan view of electrode terminals formed on an element substrate viewed from the side opposite an FPC substrate, FIG. 4 is a plan view of electrode terminals formed on the FPC substrate viewed from the side opposite the element substrate, FIG. 5 is an illustrative view of a helical curve, FIGS. 6A and 6B are illustrative views showing a method of designing electrode terminals on the element substrate, FIGS. 7A and 7B are illustrative views showing a method of designing electrode terminals on the FPC substrate, FIG. 8 is a state diagram of the electrode terminals on the two substrates viewed in projection from the side of the element substrate before positioning is made, FIG. 9 is a state diagram of the electrode terminals on the two substrates viewed in projection from the side of the element substrate when reference points are positioned, FIG. 10 is a state diagram of the electrode terminals, positioned by relatively rotating the two substrates with respect to the center of the reference points, viewed in projection from the element substrate, FIG. 11 is an illustrative view showing a modified example of an arrangement of the electrode terminals, and FIG. 12 is a view showing an electronic apparatus.

First, there will be described a configuration of a liquid crystal device corresponding to an electro-optical device in which a flexible printed circuit board (or FPC substrate) is mounted to a liquid crystal panel (or liquid crystal display (LCD)) as an example of a mounting structure.

Figure 2:
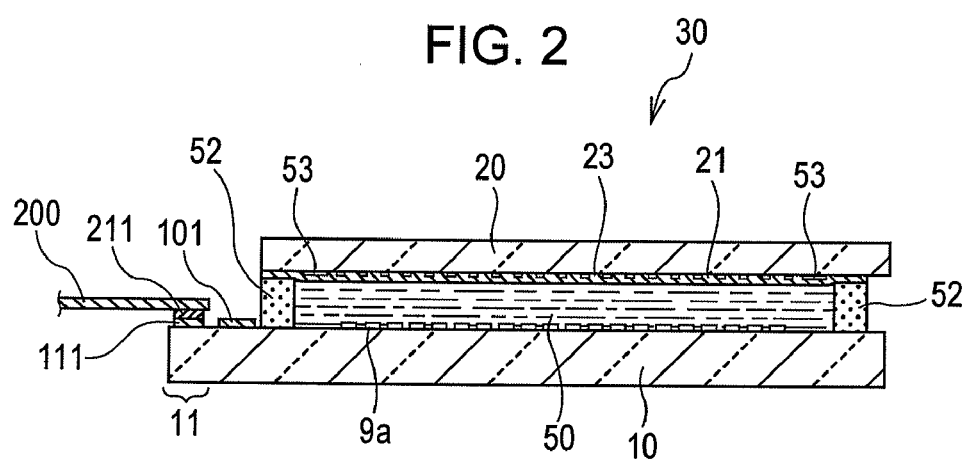
FIG. 2 is a sectional view taken along H-H' of FIG. 1.

As shown in FIGS. 1 and 2, the liquid crystal device of this embodiment is, for example, a liquid crystal device of a driving circuit embedded thin film transistor (TFT) active matrix driving system. A liquid crystal panel 30 constituting principal portions of the liquid crystal device includes an element substrate 10 serving as a first substrate on which TFT elements corresponding to pixels are arranged, and a counter substrate 20 arranged to face the element substrate 10. Herein, the element substrate 10 and the counter substrate 20 are, for example, a transparent substrate such as a quartz substrate, a glass substrate, or the like. The element substrate 10 has a slightly larger area than the counter substrate 20 such that an edge portion along one side thereof juts out from the counter substrate 20. A region (or mounting region) where an FPC substrate serving as a second substrate as described below is mounted is set in the edge portion of the element substrate 10 jutting out from the counter substrate 20.

The element substrate 10 and the counter substrate 20 are bonded with each other through a sealant 52 formed in a rectangular frame shape. At the inner side of the sealant 52, liquid crystal 50 serving as an electro-optical material is interposed between the element substrate 10 and the counter substrate 20. To bond together the element substrate 10 and the counter substrate 20, the sealant 52 is made of, for example, thermal curing resin, thermal and light curing resin, light curing resin, or ultraviolet ray curing resin, or the like. After the sealant 52 is coated on the element substrate 10 in a manufacturing process, the sealant 52 is hardened by heat, heat and light irradiation, light irradiation, ultraviolet ray irradiation, or the like.

To set the spacing between the two substrates (or the inter-substrate gap) to a predefined value, a gap material such as glass fiber or glass beads is mixed into the sealant 52. If the electro-optical device is a liquid crystal device for performing display at the same magnification in a large size like a liquid crystal display or liquid crystal television, the gap material can be included in the liquid crystal layer 50.

In four corners of the counter substrate 20, upper and lower conductors 106 are provided. Electrical conduction is made between upper and lower conductive materials provided in the element substrate 10 and a counter electrode 21 provided in the counter substrate 20.

In FIG. 1 and FIG. 2, a peripheral light shielding film 53 having a function of blocking light defining an image display region 10a is provided in parallel to the inner side of a seal region in which the sealant 52 is arranged.

As shown in FIG. 2, an alignment film is formed onto a pixel electrode 9a after a pixel switching TFT or scanning line, a data line, and the like are formed onto the element substrate 10. On the other hand, an alignment film is formed onto an uppermost layer portion in addition to the counter electrode 21 on the counter substrate 20. The liquid crystal layer 50 is made of, for example, liquid crystal mixed with one or more types of nematic liquid crystal, and has a predefined alignment state between the pair of alignment films.

In a portion outside the seal region where the sealant 52 is arranged, a data line driving circuit 101 is provided in the element substrate 10 along one side at which the mounting region 11 is formed. Scanning line driving circuits 104 are provided along two sides adjacent to the one side. At one remaining side of the element substrate 10, a plurality of wirings 105 and the like are provided to establish a connection between the scanning line driving circuits 104 at both sides of the image display region 10a.

A plurality of electrode terminals (or first electrode terminals) 111 are provided in the mounting region 11 (see FIG. 3). For example, the electrode terminals 111 are electrically connected to the driving circuits 101 and 104 through wirings 115, and are arranged in a line along one side of the element substrate 10, thereby forming a first terminal group 110 in the mounting region 11. In the mounting region 11, a first alignment mark 112 is formed as a mark for defining a reference point (or first reference point) to each electrode terminal 111. In this embodiment, the first alignment mark 112 is arranged at one side of the first terminal group 110 in which the multiple electrode terminals 111 are arranged (or to the left of the first terminal group 110 in FIG. 3).

At an end of the FPC substrate 200, a plurality of electrode terminals (or second electrode terminals) 211 are provided on a surface opposite the mounting region 11 of the element substrate 10 (see FIG. 4). For example, these electrode terminals 211 are electrically connected to an external circuit (not shown) and the like through the wirings 215 and are arranged in a line in correspondence with the electrode terminals 111 on the element substrate 10, thereby forming a second terminal group 210. On the surface opposite the element substrate 10 in the FPC substrate 200, a second alignment mark 212 is formed as a mark for defining a reference point (or second reference point) for each electrode terminal 211 in a position corresponding to the first alignment mark 112. In this embodiment, the second alignment mark 212 is arranged to one side of the second terminal group 210 in which the multiple electrode terminals 211 are arranged (or to the left of the second terminal group 210 in FIG. 4).

Since FIGS. 3 and 4 show the element substrate 10 and the FPC substrate 200 viewed from the opposite side, the positional relationship between the electrode terminals 111 and the electrode terminals 211 forming pairs and the positional relationship between the first alignment mark 112 and the second alignment mark 212 are symmetric.

The FPC substrate 200 is mounted in the mounting region 11 of the element substrate 10 by anisotropic conductive sheet (ACF) pressure bonding of its end, and electrically connects an external circuit and the like to the LCD 30 by electrically connecting the corresponding electrode terminals 111 and 211 (see FIG. 2).

Next, the electrode terminals 111 and 211 forming the element substrate 10 and the FPC substrate 200 will be described in detail.

As shown in FIG. 3, the electrode terminals 111 include a basic portion 111a and an additional portion 111b extending from the basic portion 111a in a curved manner. As shown in FIGS. 6A and 6B, when additional portions 111b are arranged to pass through basic portions 111a (for example, their centers $P_1, P_2, \ldots$) by rotating one helical curve S with respect to the center of an origin point O (or a first reference point defined by the first alignment mark 112), the additional portions 111b are formed to extend in a direction along the helical curve S from the basic portions 111a.

The helical curve S is depicted by rotating a displacement point P around the origin point O from a starting point $P_o$ such that a distance R from the origin point O is in proportion to a rotation angle θ. More specifically, the helical curve S is depicted by rotating the displacement point P from the starting point $P_o$ around the origin point O while varying the distance R from the origin point O in proportion to an exponential function in which a value other than 1 is the base and a rotation angle is the exponent. That is, for example, in an x-y coordinate system having the origin point O, a point P (x, y) on the helical curve S can be defined by $x=R_0 \cdot (R_{2\pi}/R_0)^{\theta/2\pi} \cdot \cos \theta$ and $y=R_0 \cdot (R_{2\pi}/R_0)^{\theta/2\pi} \cdot \sin \theta$, where $R_0$ is a distance between the starting point $P_0$ and the origin point O and $R_{2\pi}$ is a distance between $P_{2\pi}$ (not shown) and the origin point O when θ=2π.

As shown in FIG. 4, the electrode terminals 211 formed on the FPC substrate 200 include a basic portion 211a and an additional portion 211b extending from the basic portion 211a in a curved manner. As shown in FIGS. 7A and 7B, when additional portions 211b are arranged to pass through basic portions 211a (for example, their centers $P_1, P_2, \ldots$) by rotating one helical curve S with respect to the center of an origin point O (or a second reference point defined by the second alignment mark 212), the additional portions 211b are formed to extend in a direction along the helical curve S from the basic portions 211a.

Since the electrode terminals 111 and 211 are formed on the opposite surfaces of the element substrate 10 and the FPC substrate 200, the helical curves S (and the points $P_1, P_2, \ldots$) defining the shapes of the additional portions 211b of the electrode terminals 211 actually have a mirror image relationship with the helical curves S (and the points $P_1, P_2, \ldots$) defining the shapes of the additional portions 111b of the electrode terminals 111.

In this embodiment, the terminal widths of the electrode terminals 111 and 211 forming the pairs are set to relatively different terminal widths. For example, in the electrode terminals 111 and 211, the terminal widths of the electrode terminals 111 are set to be larger than those of the electrode terminals 211. In the first terminal group 110 formed from the electrode terminals 111 whose terminal width is set to be relatively large, an aperture portion 111c in which the terminal width is partially small is formed on at least one electrode terminal 111. In this embodiment, the aperture portion 111c is formed, for example, in midway along the electrode terminal 111 positioned farthest from the first alignment mark 112.

As shown in FIGS. 6A and 6B and FIGS. 7A and 7B, lengths $D_1, D_2, \ldots$ of the electrode terminals 111 and 211 in which the additional portions 111b and 211b are added to the basic portions 111a and 211a are set, for example, such that widths W of the first and second terminal groups 110 and 210 are substantially uniform. Alternatively, although not shown, it is possible to set the lengths of the additional portions 111b and 211b in proportion to the rotation angle θ from the starting point $P_o$ of the displacement point P in a method of setting the electrode terminals 111 and 211. In this case, more specifically, it is preferable that the lengths of the additional portions 111b and 211b are set to be defined by an exponential function with the exponent of a power of the rotation angle from the starting point $P_o$ of the displacement point P.

FIGS. 6A and 6B and FIGS. 7A and 7B show an example in which the additional portions 111b and 211b are formed along the helical curve S at both sides of the basic portions 111a and 211a. Alternatively, the additional portions 111b and 211b can be formed at only any one side of the basic portions 111a and 211a. Only the basic portions can be formed at any one side of the electrode terminals 111 or the electrode terminals 211.

In this configuration, an arbitrary point on the element substrate 10 and the FPC substrate 200 is shifted along the helical curve S as described above when the element substrate 10 and the FPC substrate 200 isotropically expand or contract due to the influence of humidity or heat. In this embodiment, since at least one side of the electrode terminals 111 on the element substrate 10 or the electrode terminals 211 on the FPC substrate 200 extends along the helical curve S, positioning between the electrode terminals 111 and 211 forming the pairs is possible even when expansion/contraction occurs.

In this embodiment, positioning between the electrode terminals 111 and 211 forming the pairs is made while observing relative positions of the electrode terminals 111 and 211 from the side of the element substrate 10 serving as a transparent substrate. In this case, positioning of the electrode terminals 111 and 211 of the pairs uses the first and second reference points defined by the first and second alignment marks 112 and 212 as described below. Accordingly, the first and second alignment marks 112 and 212 are formed in a basic shape of a circle, such that the reference points can be detected from the alignment marks 112 and 212. A plurality of notches are provided in the first alignment mark 112 such that the second alignment mark 212 can be observed even when the first alignment mark 112 overlaps with the second alignment mark 212.

A procedure in the case where the FPC substrate 200 is mounted to the LCD 30 (or the element substrate 10) will be described with reference to FIG. 8 to FIG. 10.

In the first procedure, the LCD 30 and the FPC substrate 200 are set to jigs (or first and second jigs (not shown)) movable relatively to each other. According to relative movement between the jigs, the FPC substrate 200 is arranged facing the mounting region 11 of the LCD 30 (or the element substrate 10) in a non-contact form (see FIG. 8). In this embodiment, for example, the first jig for holding the LCD 30 is a fixture jig for holding in a preset position, and positioning of the LCD 30 to the first jig is made using the first alignment mark 112 (or the first reference point). Meanwhile, the second jig for holding the FPC substrate 200 is movable relative to the first jig. Positioning of the FPC substrate 200 to the second jig is made using the second alignment mark 212 (or the second reference point). The second jig is movable in three axis directions (or X-Y-Z directions) as shown in FIG. 8 and is rotatable around the Z-axis (in the θ direction) with respect to the center of the second reference point defined by the second alignment mark 212 of the FPC substrate 200.

Subsequently, positioning is made to superimpose the first reference point defined in the first alignment mark 112 and the second reference point defined in the second alignment mark 212 by moving the second jig in the X-Y axis direction while observing the first and second alignment marks 112 and 212 from the side of the element substrate 10 (in a first positioning procedure) (see FIG. 9).

Subsequently, positioning is made to superimpose the electrode terminals 111 and 211 forming the pairs by rotating the second jig around the Z-axis (in the θ direction) with respect to a supporting point of the first and second reference points while observing the electrode terminals 111 and 211 forming the pairs from the side of the element substrate 10 (in a second positioning procedure) (see FIG. 10).

In this case, since the electrode terminals 111 and 211 extend along the helical curve S as described above, the electrode terminals 111 and 211 of the pairs can reliably coincide in only relative movement around the Z-axis even though the element substrate 10 and the FPC substrate 200 expand or contract if the first and second reference points coincide. Positioning of the electrode terminals 111 and 211 of the pairs is sufficiently made with only positioning of one pair of electrode terminals 111 and 211. It is preferable that the electrode terminals 111 and 211 of the pair are one pair of electrode terminals 111 and 211 located farthest from the first and second alignment marks 112 and 212. That is, the pair of electrode terminals 111 and 211 located farthest from the first and second alignment marks 112 and 212 are suitable for minute positioning since a variation of a relative position according to rotation is largest. As the aperture portion 111c is formed to the electrode terminal 111 located farthest from the first alignment mark 112, the relative positions can minutely coincide without completely concealing the electrode terminal 211 according to the superimposition of the electrode terminal 111.

After this positioning is made, contact/pressure is applied to the FPC substrate 200 with respect to the element substrate 10 by moving the second jig in the Z-axis direction. The FPC substrate 200 is mounted in the mounting region 11 of the element substrate 10 by anisotropic conductive sheet (ACF) pressure bonding and an electric connection is made between the corresponding electrode terminals 111 and 211.

According to this configuration, positional deviations between the corresponding electrode terminals 111 and 211 can be absorbed even when the element substrate 10 and the FPC substrate 200 isotropically expand or contract by forming at least one of the electrode terminals 111 or the electrode terminals 211 in a bow shape extending in a direction along the helical curve S. Furthermore, the reference points (or first and second reference points) set in relation to the electrode terminals 111 and 211 on the substrates 10 and 200 can coincide with the reference point of the helical curve S. If the alignment marks (or first and second alignment marks 112 and 212) indicating the reference points are formed, positioning between the electrode terminals 111 and 211 can be facilitated by only relatively rotating the two substrates 10 and 200 in which both the alignment marks 112 and 211 directly coincide.

Since the curvature of the helical curve S around the reference point extremely increases if the electrode terminal is formed in the bow shape along the helical curve, it is unsuitable to form the electrode terminal and a dead space is caused. However, the dead space can be suppressed at minimum by arranging each reference point at one side of each terminal group.

Conversely, for example, the first and second reference points (or the first and second alignment marks 112 and 212) can be arranged in central portions of the terminal groups 110 and 120 as shown in FIG. 11. That is, the electrode terminals 111 and 211 can be arranged at both sides of the first and second reference points. According to this configuration, a displacement amount from the reference points of the electrode terminals 111 and 211 can be minimized. Specifically, this configuration is effective when the substrates 10 and 200 are relative large-sized substrates.

Next, an electronic apparatus having an electro-optical device (or liquid crystal device) will be described. FIG. 12 is a perspective view showing a configuration of a portable phone 1200 using an electro-optical device.

As shown in this drawing, the portable phone 1200 is provided with the above-described electro-optical device as well as a plurality of operation buttons 1202, an earpiece 1204 and a mouthpiece 1206. Since elements other than the liquid crystal panel 30 of the electro-optical device are embedded inside the phone, the components are not externally shown.

The liquid crystal device is not limited to the above-described illustrative examples. Of course, many variations are possible without departing from the spirit of the invention. For example, the above-described liquid crystal device has been illustrated as a liquid crystal device of an active matrix system using active elements such as thin film transistors (TFTs). Without limitation to this, a liquid crystal device of an active matrix system using active elements such as TFDs (thin film diodes) can be applied.

In this embodiment, an electro-optical device has been illustrated as a liquid crystal device. Without limitation to this, the invention can be applied to various electro-optical devices such as an electro-luminescence device, particularly, an organic electro-luminescence device or an inorganic electro-luminescence device, a plasma display device, a field emission display (FED) device, a surface-conduction electron-emitter display (SED) device, a light emitting diode (LED) device, an electrophoretic display device, and a device using a small-sized television using a slim cathode ray tube, a liquid crystal shutter, or the like.

Of course, the mounting structure of the invention can be applied to mount various substrates of an FPC substrate and like in various electro-optical devices as described above, semiconductor devices, and the like.

Electronic apparatuses to which the electro-optical device is applied are a portable phone, a laptop personal computer, a liquid crystal display television set, a view-finder type (or monitor-direct-view type) videotape recorder, a car navigation device, a pager, an electronic notebook, an electronic calculator, a word processor, a workstation, a television phone, a point of sale (POS) terminal, and other devices having touch panels. The above-described electro-optical device can be applied as a display device of theses electronic apparatuses.

What is claimed is:

1. A mounting structure, comprising:
   a first substrate on which a first reference point and a plurality of first electrode terminals are arranged on an identical plane; and a second substrate on which a second reference point forming a pair with the first reference point and a plurality of second electrode terminals electrically connected to the plurality of first electrode terminals respectively forming pairs with the plurality of first electrode terminals are arranged on an identical plane, wherein the plurality of first electrode terminals and the plurality of second electrode terminals forming the pairs each have a basic portion in which a relative position from the first reference point and a relative position from the second reference point are set to be equal to each other, at least one of each of the plurality of first electrode terminals and each of the plurality of second electrode terminals forming the pairs has an additional portion extending from the basic portion, each additional portion is formed to extend in a direction along a helical curve from the basic portion when the additional portion is arranged to pass through the basic portion by rotating one helical curve having a center of the reference point mapped thereto, and the first reference point and the second reference point are superimposed and the plurality of first electrode terminals and the plurality of second electrode terminals respectively forming the pairs are superimposed and electrically connected.

2. The mounting structure according to claim 1, wherein the helical curve is depicted by rotating a displacement point from a starting point around an origin point while varying a distance from the origin point in proportion to an exponential function in which a value other than 1 is a base and a rotation angle is an exponent.

3. The mounting structure according to claim 1, wherein the first reference point is arranged to one side of an arrangement of the plurality of first electrode terminals, and the second reference point is arranged to one side of an arrangement of the plurality of second electrode terminals.

4. The mounting structure according to claim 1, wherein an arrangement of the plurality of first electrode terminals is disposed at both sides of the first reference point, and an arrangement of the plurality of second electrode terminals is disposed at both sides of the second reference point.

5. The mounting structure according to claim 1, wherein terminal widths of the plurality of first electrode terminals and the plurality of second electrode terminals forming the pairs are formed to have relatively different terminal widths, and an aperture portion in which a terminal width is partially small is formed on at least one electrode terminal of the plurality of first electrode terminals whose terminal widths are relatively large or the plurality of second electrode terminals.

6. An electronic apparatus, comprising:
a mounting structure according to claim 1.

7. An electro-optical device, comprising:
a first substrate on which a first reference point and a plurality of first electrode terminals are arranged on an identical plane; and a second substrate on which a second reference point forming a pair with the first reference point and a plurality of second electrode terminals respectively forming pairs with the plurality of first electrode terminals are arranged on an identical plane, wherein the plurality of first electrode terminals and the plurality of second electrode terminals forming the pairs each have a basic portion in which a relative position from the first reference point and a relative position from the second reference point are set to be equal to each other, at least one of each of the plurality of first electrode terminals and each of the plurality of second electrode terminals forming the pairs has an additional portion extending from the basic portion, each additional portion is formed to extend in a direction along a helical curve from the basic portion when the additional portion is arranged to pass through the basic portion by rotating one helical curve having a center of the reference point mapped thereto, and the first reference point and the second reference point are superimposed and the plurality of first electrode terminals and the plurality of second electrode terminals respectively forming the pairs are superimposed and electrically connected.

8. An electronic apparatus, comprising:
an electro-optical device according to claim 7.

9. A method of manufacturing a mounting structure, the mounting structure including a first substrate on which a first reference point and a plurality of first electrode terminals are arranged on an identical plane, and a second substrate on which a second reference point forming a pair with the first reference point and a plurality of second electrode terminals respectively forming pairs with the plurality of first electrode terminals are arranged on an identical plane, wherein the plurality of first electrode terminals and the plurality of second electrode terminals forming the pairs each have a basic portion in which a relative position from the first reference point and a relative position from the second reference point are equal to each other, at least one of each of the plurality of first electrode terminals and each of the plurality of second electrode terminals forming the pairs has an additional portion extending from the basic portion, and each additional portion is formed to extend in a direction along a helical curve from the basic portion when the additional portion is arranged to pass through the basic portion by rotating one helical curve having a center of the reference point mapped thereto, the method comprising:

a first positioning procedure of superimposing the first reference point and the second reference point by arranging the first substrate and the second substrate to face each other; and a second positioning procedure of relatively rotating the first substrate and the second substrate by setting the superimposed first and second reference points to a supporting point and superimposing the plurality of first electrode terminals and the plurality of second electrode terminals forming the pairs.

* * * * *